Jan. 11, 1966  D. PERRY, JR  3,228,174
MULTIPHASE FLUID SEPARATION
Filed Aug. 2, 1962
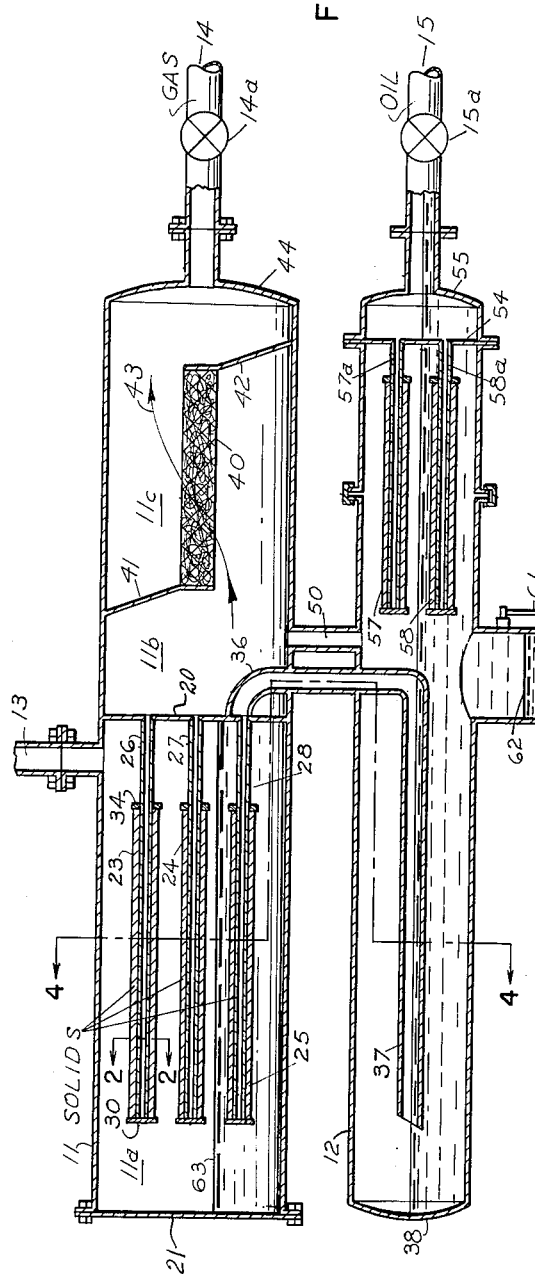
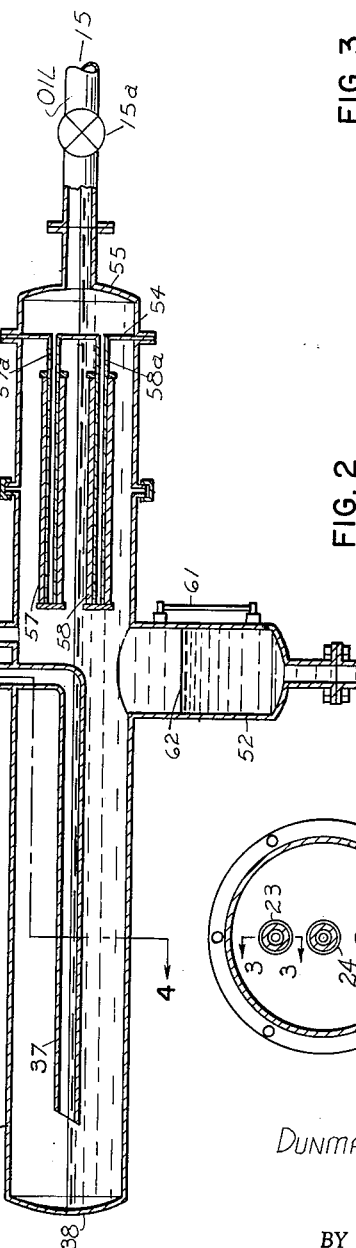
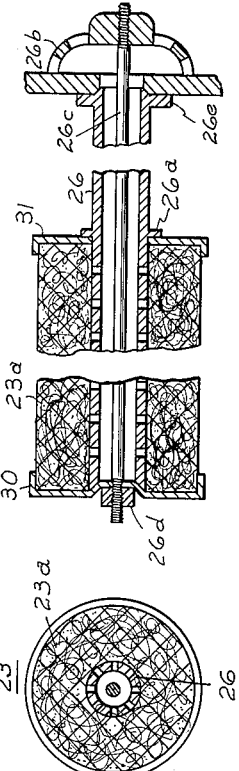
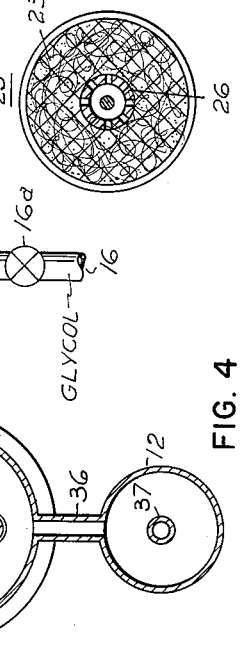
DUNMAN PERRY JR.
INVENTOR.
BY D. Carl Richards
ATTORNEY

United States Patent Office 3,228,174
Patented Jan. 11, 1966

3,228,174
MULTIPHASE FLUID SEPARATION
Dunman Perry, Jr., Mineral Wells, Tex., assignor to Perry Equipment Corporation, Mineral Wells, Tex., a corporation of Texas
Filed Aug. 2, 1962, Ser. No. 214,288
15 Claims. (Cl. 55—45)

This invention relates to multiphase fluid separation and more particularly to separating gases, immiscible liquids, and solids, simultaneously in one separator vessel. In a more specific aspect, the invention relates to a four phase separator or three phase fluid and solids separator free of moving parts, and of relatively small body size but of high capacity.

In the production, processing, and control of natural gas streams in preparation for delivery to a pipeline or to a consumer, it is desirable to remove from the gas stream certain entrained constituents including liquid hydrocarbons and solid matter which are carried along with the gas stream. It is also customary to process natural gas streams for the removal of hydrogen sulfide and to reduce the water content thereof. It is often necessary to include such treating systems at oil field locations. At many such locations, the only energy available is that contained in the stream itself. It is therefore desirable to provide an adequate treating system which is free from moving parts and which is capable of operation only under the application of energy of the production being treated. Further, it is desirable to provide as simple a system as possible and yet one which will adequately serve to remove all of the entrained constituents so that a substantially dry gas can be ultimately delivered from the processing location.

It is an object of the present invention to provide an apparatus and method for simultaneous coalescing or agglomerating liquids present in a gas stream, followed by phase separation of the gas stream as well as separation of the immiscible liquids present by taking advantage of the difference in interfacial tension between the immiscible liquids.

With the device of the present invention, fluids to be separated are passed through a plurality of coalescing gas and liquid phase filter elements, acting in parallel, which serve to coalesce the dispersed phases from the gas stream as well as remove any particles of solid matter that may be present in the dispersed phases. The gas phase, as well as the immiscible liquid phases, are then passed through an elongated path at which point the gas phase is separated, and the mixed phases flow by gravity to a lower chamber of the same process vessel at which point the lighter liquid phase is separated from the coalesced and heavier phase by means of gravity and, finally, by a separating membrane treated to pass only one of the liquids.

Prior to leaving the separator vessel, the gas phase flows upward through an internal mist eliminator element, where final traces of suspended liquids are removed, and drained to the lower section of the process vessel. Under rigorous conditions for conventional phase separator operation, it has been found that a final internal mist eliminator is far more efficient if placed in a gas stream after passing the gas through gas and liquid phase filtering and coalescing elements. This is because the droplets are often of extremely small particle size as encountered in the dispersed gas phase. An increase in liquid droplet particle size of from ten to one hundredfold is obtained during the gas-liquid coalescing operation, thereby eliminating all small liquid droplets or fog from entering the gas mist eliminator.

More particularly, in accordance with the present invention, there is provided a horizontally disposed upper vessel coupled to a horizontally disposed lower vessel. A bulkhead divides the upper vessel into two chambers. A gas inlet port leads to the upper vessel at one side of a bulkhead with flow channels leading from one chamber to the other chamber by way of a plurality of outside-inflow type coalescer units. In the other side of the upper vessel there is provided a mist eliminator in the gas flow path leading to an outlet port. A liquid flow channel leads to the lower vessel from the first chamber by way of the coalescer unit and by way of an elongated flow channel within the lower vessel. A second connection is provided between the upper and lower vessels for flow of liquids removed from the gas stream by the mist eliminator. Liquid outlet port means are then provided for at least two different gravity constituents of the liquids in the lower vessel.

For a more complete understanding of the present invention and for further objects and advantages thereof, reference may now be had to the following description taken in conjunction with the accompanying drawings in which:

FIGURE 1 is a longitudinal sectional view of the preferred embodiment of the present invention;

FIGURE 2 is a sectional view of a coalescer unit taken along the line 2—2 of FIGURE 1;

FIGURE 3 is a fragmentary sectional view taken along the line 3—3 of FIGURE 4; and FIGURE 4 is a sectional view taken along the line 4—4 of FIGURE 1.

Referring to the drawings, the separator vessel comprises two horizontally positioned cylindrical casings 11 and 12 with casing 11 spaced above casing 12. Casings 11 and 12 taken together form the outer shell of the separator unit. A gas stream is introduced into the upper casing 11 by way of an input flow channel 13. Gas separated from the input stream is delivered from the separator by way of a first output flow channel 14. Liquid hydrocarbons are extracted from the separator by way of the liquid output channel 15. A treating fluid such as glycol or water, separated from the input stream, is extracted from the separator by way of the channel 16. Any solids entrained in the input gas stream are deposited in filter elements positioned in chamber 11a of casing 11 so that four phases of the input stream are individually delivered from the separator.

The upper casing 11 is provided with a bulkhead at a midpoint thereof to form two chambers 11a and 11b. The input channel 13 enters chamber 11a. The end of the casing 11 is closed by a plate 21. The end plate 21 of the casing 11 is shown bolted onto a flange at the end of casing 11. Preferably, the end coupling means for securing plate 21 will be of the quick opening type for access to the filter elements 23–25. Positioned in chamber 11a are a plurality of removable coalescer units, three units 23, 24, and 25, being illustrated in FIGURE 1. Units 23, 24, and 25 are coalescer units of the outside-inflow type. The units themselves are mounted on tubes 26, 27, and 28, respectively. The tubes 26, 27, and 28 are hollow tubes which are perforated over the section between the stop members 30 and 31 so that gas may pass through the coalescer elements and then through the walls of the tubing for flow directly into the chamber 11b through the bulkhead 20.

In FIGURE 2 the construction of the coalescer unit 23 is shown as including a cylinder 23a which is mounted on tubing 26. The tubing 26 is provided with a plurality of radially extending ports through the walls thereof so that the gas will flow from the outside into the center channel.

As best shown in FIGURE 3, the tube 26 has a shoulder 26a at an intermediate point thereon. The stop disk 31 is mounted against the shoulder 26a. The filter element 23 is then positioned against the stop 31 by the stop 30. FIGURE 3 includes a spider 26b which is rigidly secured at its base to the bulkhead 20 in chamber 11b. The spider has a threaded body in which a rod 26c is secured. A nut 26d then serves to retain a tube 26, stops 30 and 31 and the filter element 23a in a fixed position. The tube 26 is provided with flanges 26e which bear against the bulkhead so that the filter 23 extends along the line parallel to the axis of the casing 11.

Each of the filter elements 23–25 are similarly mounted. The elements themselves are of a type well-known and are preferably cylindrical, tubular, molded filter elements fabricated of glass fiber bonded with a synthetic resin or a synthetic organic fiber material such as a polyester fiber. The flow of gas and liquids from the outside to the inside of the elements through the permeable walls thereof causes the entrained liquids to be coalesced. At the same time any solids in the stream are deposited on the filter tube. The filament density of the coalescing elements 23–25 preferably should be graded from a relatively low density at the outside to a relatively high-density adjacent the tube 26. Such structure provides substantial storage space in the outer portion thereof for the accumulation of the solid mater as well as to provide for efficient liquid coalescing at the inner wall of the filter element.

It will be noted that the lower element 25 is inundated in liquid. The center channel in unit 25 leads to a flow channel 36 which passes through bulkhead 20 and extends downwardly through the wall of the casing 11 and into casing 12. Channel 36 has an elongated horizontally disposed section 37 which extends toward the end 38 of the casing 12.

Chamber 11b is a gas chamber which includes a mist eliminator 40. The mist eliminator preferably is a web of stainless steel fibers densely woven to form a permeable structure which eliminates mist as gas passes therethrough. An upper bulkhead member 41 is sealed to the upper half of the casing 11 and supports the mist eliminator 40. A second bulkhead member 42 is secured to the lower half of the casing 11 and supports the mist eliminator 40 at the other end thereof so that the gas flow path is as generally indicated by the arrow 43. The dry gas chamber 11c in casing 11 is closed by an end plate 44 through which the output channel 14 extends. A valve 14a is provided for control of the gas flow line 14.

Any fine mist which passes through the coalescer elements 23 and 24 will be removed by the mist eliminator 40. The fact that all of the solids have been removed from the gas stream by the coalescers 23 and 24 permits the mist eliminator 40 to be installed in the manner shown for trouble-free operation. The liquid constituents of the gas flow which may pass the coalescers 23 and 24 will be removed with the droplets thereof falling to the bottom of the chamber 11b. A second interconnecting channel 50 extends from chamber 11a into casing 12 so that the liquids can flow down into the lower casing 12.

Thus, liquids enter casing 12 by way of the downcomer 36 as well as downcomer 50. The liquids entering by way of path 36 are the coalesced liquids separated by the units 23, 24, and 25. The liquids flowing by way of path 50 represent the mist constituents of the gas passing through the coalescer elements 23 and 24.

The casing 12 has a vertical cylindrical extension 52 which extends downwardly from an intermediate point thereon. It also is provided with a bulkhead 54 near the right hand end which is maintained in position by suitable fastening means which couple an end cap 55 thereto. The bulkhead 54 supports additional filter units 57 and 58. Preferably units 57 and 58 each consist of a supported membrane of material impervious under ordinary circumstances to the heavier phase of the liquids removed from the gas stream. The membrane may be a fabric treated with various chemical agents such as silicones or may be constructed of naturally repellent fabrics of synthetic fibers such as marketed under the names of "nylon" or "Teflon." Such fabrics will pass liquid hydrocarbons but will not permit water or glycol to pass therethrough. The choice of the membrane material is dependent upon the nature of the mixture of liquids handled by the separator. Liquids passing through the elements 57 and 58 then flow by way of the output flow line 15 which is controlled by valve 15a.

The extension 52 forms a sump in which the heavy phase of the liquids can settle. The flow line 16 leads downwardly from vessel 52 and is controlled by valve 16a. A liquid level gauge 61 is provided to permit observation of the interface 62 between the heavy phase and light phase liquids. In the sectional view of FIGURE 4 only three filter elements 23, 24, 25 are shown. Depending upon the volume of materials to be handled, the entire area of the bulkhead 20 may be occupied by such filter elements. Several of the elements such as elements 25 may then be connected to the path 36 leading to the lower casing 12. At the same time a multiplicity of units such as the units 26 and 27 operating above the liquid level 63 will form flow channels leading to the chamber 11b.

In operation of the separator disclosed herein, when the mixture of gas, liquids, and solids flowing to the separator consists of dispersed phases of solids, such as pipe scale in natural gas along with hydrocarbon liquids, and diethylene glycol solution, the mixture is introduced into chamber 11a. It will be noted that inlet 13 is located at such a point that the incoming fluid stream does not impinge directly on coalescer elements 23 and 24. If the stream were allowed to strike the elements, failure due to erosion ultimately would result.

Pipe scale and all solid matter present in the stream entering by line 13 are deposited in and on the surface of coalescer elements 23, 24, and 25. Natural gas and suspended droplets of hydrocarbon liquid and diethylene glycol solution flowing from the outside of the elements 23 and 24 toward the inside are coalesced into much larger particles that readily flow by gravity to the bottom of chamber 11a.

A mixture of natural gas and some coalesced droplets of liquids leaves elements 23 and 24 by means of the collector tubes 26 and 27 and flows to mist eliminator element 40, where gravity separation occurs between the natural gas stream and the enlarged liquid droplets. The natural gas stream, now completely stripped of any suspended liquid particles, flows from the top of mist eliminator element 40 and into chamber 11c leaving the separator at the gas outlet 14.

Liquid hydrocarbons and diethylene glycol contained in the natural gas stream entering chamber 11a, which are not in a finely dispersed phase, collect in the bottom portion of chamber 11a and accumulate to a point where the liquids flow through coalescer filter element 25. At the same time they are filtered and any emulsion present is coalesced into two distinct phases by passage through coalescer element 25.

The coalesced mixture of liquid hydrocarbons and diethylene glycol liquids leaves coalescer element 25 through collector tube 28 and flows through downcomer 36 into the lower liquid separator chamber in casing 12. Coalesced liquids enter chamber 12 by means of the extension 37 of downcomer 36.

The purpose of this extension 37 is to cause the coalesced liquids to flow the entire length of chamber 12, and thus take full advantage of the chamber length for gravity separation prior to final separation at the impervious membrane type elements 57 and 58. This procedure reduces the operating load on elements 57 and 58 and permits use of a smaller size casing for chamber 12.

Hydrocarbon liquid and diethylene glycol solution, upon leaving downcomer extension 37 flow the length of chamber 12, and the major portion of diethylene glycol solution is collected at sump 52, while the hydrocarbon liquid flows back the full length of chamber 12, and then passes through membrane elements 57 and 58, through collector tubes 57a and 58a, and then flows from the separator through the light liquid outlet 15.

For use in a glycol system, elements 57 and 58 preferably are covered with a finely woven nylon sleeve over a substantial wire mash support. Any diethylene glycol present in the liquid hydrocarbon stream flowing onto impervious membrane elements 57 and 58 is deposited on the outside wall of the membrane, eventually increases in size, and flows by gravity to the bottom of chamber 12, and is collected at the heavy liquid sump 52.

The general construction of this device is such that all filter and coalescing elements can be readily removed for repair or replacement as required. The construction is also arranged so that a minimum of installation expense is involved for placing the unit in initial operation. As compared to conventional separators using gravity separation methods alone, the invention embodies a much smaller apparatus to perform a given operation.

While there has been illustrated and described a typical form of embodiment of the invention, it will be apparent to those skilled in the art, that changes may be made in the form of the apparatus disclosed, without departing from the spirit of the invention, as set forth in the appended claims.

What is claimed is:
1. A multiphase separator which comprises:
   (a) a horizontally disposed upper vessel having a bulkhead at an intermediate point forming a first chamber and a second chamber therein,
   (b) a horizontally disposed lower vessel,
   (c) a gas inlet leading into said first chamber and a gas outlet leading from said second chamber,
   (d) flow channels leading from said first chamber to said second chamber including outside-inflow type coalescer units, the interiors of which are flow-connected through said bulkhead,
   (e) structure including a mist eliminator in said second chamber between said bulkhead and said gas outlet,
   (f) a liquid flow channel leading to said lower vessel from said first chamber and including at least one of said coalescer units and an elongated confined channel within said lower vessel,
   (g) phase separator structure in said lower vessel, and
   (h) a liquid outlet leading from said lower vessel on both sides of said phase separator structure.
2. A multiphase separator which comprises:
   (a) a horizontally disposed upper vessel having a bulkhead at an intermediate point forming a first chamber and a second chamber therein,
   (b) a horizontally disposed lower vessel,
   (c) a gas inlet leading into said first chamber and a gas outlet leading from said second chamber,
   (d) flow channels leading from said first chamber to said second chamber including outside-inflow type coalescer units, the interiors of which are flow-connected through said bulkhead,
   (e) structure including a mist eliminator in said second chamber between said bulkhead and said gas outlet,
   (f) a liquid flow channel leading to said lower vessel from said first chamber and including at least one of said coalescer units and extending through an elongated cylinder of substantially smaller diameter than said lower vessel positioned at the axis of said lower vessel,
   (g) structure forming a first liquid outlet at the bottom of said second vessel,
   (h) structure forming a second liquid outlet at an elevation substantially above the bottom of said second vessel, and
   (i) a fabric phase separator positioned in said lower vessel adjacent said second liquid outlet.
3. The combination set forth in claim 2 in which said outside-inflow type coalescer units are formed of hollow cylinders of fibrous material of progressively decreasing density with distance from the axis thereof.
4. The combination set forth in claim 2 in which a second liquid flow channel leads between said upper vessel and said lower vessel coupling said second chamber directly to said lower vessel.
5. The combination set forth in claim 2 in which each of said coalescer units comprises a hollow cylinder of fibrous material mounted on one end of a rigid cylinder which cylinder is perforated in the area leading to said hollow cylinder and which extends to and is supported at the other end by said bulkhead.
6. The combination set forth in claim 2 in which said coalescer units and said fabric phase separator are detachably secured in said first chamber and in said lower vessel, respectively, with the removable means forming parts of both vessels to provide access thereto.
7. The combination set forth in claim 2 in which elongated perforated cylinders support said coalescer units and said phase separator and wherein said coalescer units are hollow cylindrical tubes of fibrous material of progressively decreasing density with distance from the axis thereof and each said phase separator is a thin fabric membrane supported so as to maintain cylindrical form.
8. A multiphase separator which comprises:
   (a) a first elongated horizontally disposed cylinder having an intermediate bulkhead dividing said cylinder into a first chamber and a second chamber with ports extending through said bulkhead at each of a plurality of points over the height of said bulkhead,
   (b) a second cylinder horizontally disposed and connected to said first cylinder by a pair of upwardly extending flow lines both of which enter said first cylinder at the bottom of said second chamber,
   (c) a plurality of cylindrical outside-inflow type coalescer units one of which is mounted in each of said ports and extends horizontally from said bulkhead in said first chamber,
   (d) flow control structure leading from a predetermined number of said ports adjacent the bottom of said bulkhead to one of said two flow lines leaving said second cylinder,
   (e) structure forming an input flow line leading to said first chamber at a point displaced longitudinally in said first chamber from positions occupied by said coalescer units to avoid direct impingement thereon of fluids entering said first chamber,
   (f) a second bulkhead in said second chamber having a port of substantial area extending therethrough,
   (g) a metallic woven mesh positioned in the port in said second bulkhead to strip from gas flowing therethrough any mist entrained therein,
   (h) structure forming a gas output flow channel leading from said second chamber on the side of said mesh opposite the first bulkhead,
   (i) structure in said second cylinder connected to said one of said flow lines extending horizontally a substantial length axially of said second cylinder toward a first end thereof,
   (j) structure forming a first output channel leading from the bottom of said second cylinder for extraction of heavy liquids therefrom,
   (k) structure forming a second output flow channel leading from the region of the end of said second cylinder opposite said first end, and
   (l) a membrane in the flow path leading to said second output flow channel selectively impervious to said heavy liquids and permeable to lighter liquids therein.
9. A multiphase separator which comprises:
   (a) an upper cylinder having a transverse bulkhead therein, a mixture inlet port leading to a first chamber and a gas outlet port leading from a second chamber in said cylinder,
   (b) a lower vessel,

(c) structure forming a liquid flow channel leading from said first chamber to said lower vessel including a coalescer having flow paths leading from said first chamber through said bulkhead,
(d) structure forming gas flow channels between the chambers in said upper cylinder including coalescer units leading through said bulkhead,
(e) a metallic mesh mist eliminator in said second chamber in the flow path leading to said gas outlet port, and
(f) structure forming a liquid flow channel leading from said second chamber to said lower vessel.

10. A multiphase separator which comprises:
(a) a pair of vessels, the first of which is horizontally elongated having an intermediate transverse bulkhead therein dividing the same into a first chamber and a second chamber, and the second of which is disposed beneath the first and connected therewith by a direct flow channel,
(b) an input flow channel leading to said first chamber,
(c) a plurality of vertically spaced-apart coalescer units in said first chamber forming exclusive flow path through said bulkhead with structure forming a flow channel leading directly from the outlet through said bulkhead of the lowermost of said coalescer units into the lower of said vessels for impeding liquid flow from said first chamber and to maintain the lowermost of said coalescer units inundated to a degree dependent upon the relative amounts of gas and liquid entering said input flow channel and for varying the number of coalescer units under the liquid level,
(d) structure forming a gas outlet flow channel leading from said second chamber and including a knitted metallic mesh mist eliminator,
(e) structure forming a light liquid outlet flow channel leading from said second of said vessels including a membrane substantially improvious to the heavier of the liquids, and
(f) structure forming a third outlet flow channel leading from the lower portion of the lower of said vessels for the heavier of said liquids therein.

11. A multiphase separator which comprises:
(a) a first elongated horizontally disposed cylinder having an intermediate bulkhead dividing said cylinder into a first chamber and a second chamber with ports extending through said bulkhead at each of a plurality of points over the height of said bulkhead,
(b) a second cylinder horizontally disposed and connected to said first cylinder by a pair of upwardly extending flow lines both of which enter said first cylinder at the bottom of said second chamber,
(c) a plurality of rigid metallic tubes extending substantially the length of said first chamber and extending into ports in said bulkhead for forming flow channels through said bulkhead, said tubes being perforated at the ends thereof opposite said bulkhead,
(d) a rigid support means extending through said tubes and anchored at one end to said bulkhead and at the other end to the end of said tubes,
(e) a hollow fibrous cylinder over the opposite ends of each of said tubes forming an outside-inflow type coalescer,
(f) flow control structure leading from a predetermined number of the lowermost of said ports at the bottom of said bulkhead to one of said two flow lines,
(g) structure forming an input flow line leading to said first chamber at a point displaced longitudinally of said first chamber from positions occupied by the fibrous cylinders to avoid direct impingement thereon of fluids entering said first chamber,
(h) a second bulkhead in said second chamber having a port of substantial area therein,
(i) a metallic woven mesh positioned in the port in said second bulkhead to strip from gas flowing therethrough any mist entrained therewith,
(j) structure forming an output flow channel leading from said second chamber on the side of said second bulkhead opposite said intermediate bulkhead,
(k) structure in said second cylinder connected to said one of said two flow lines and extending horizontally a substantial length axially of said second cylinder toward a first end thereof,
(l) structure forming a first output channel leading from the bottom of said second cylinder for extraction of heavy liquids therefrom,
(m) structure forming a second output flow channel leading from the region of the end of said second cylinder opposite said first end, and
(n) a membrane in the flow path leading to said second output flow channel selectively impervious to the heavier of the liquids and permeable to lighter liquids therein.

12. The method of separation of constituents of a natural gas stream, which comprises:
(a) coalescing entrained liquids in said stream to remove liquid droplets entrained therein and at the same time depositing entrained solids in the coalescing zone,
(b) separately extracting fine mist from said stream at a point downstream of said coalescing zone,
(c) downstream of said coalescing zone, coalescing the extracted liquids to form large particle concentration of the different liquid constituents thereof,
(d) flowing the coalesced liquids over an elongated, horizontally disposed path for gravity separation thereof, and
(e) separately extracting dry gas at said point, solids from said coalescing zone and the separate liquids constituents after horizontal flow along said path.

13. A multiphase separator which comprises:
(a) structure forming first and second horizontally elongated zones with the first of said zones located above the second of said zones,
(b) a transverse bulkhead in the first of said zones dividing said first of said zones into two chambers,
(c) structure forming a liquid flow channel leading from the first of said chambers to said second zone and including at least one coalescer having flow paths leading from said first chamber through said bulkhead and normally maintained inundated in fluid in one of said zones,
(d) a plurality of like coalescers having flow paths leading through said bulkhead and normally positioned in a gaseous atmosphere above a liquid gas interface in one of said chambers,
(e) structure forming a gas flow channel between the second of said zones and the second of said chambers,
(f) a metallic mesh mist eliminator in said second of said chambers,
(g) structure forming a gas outlet port from said second of said chambers on the side of said eliminator opposite said bulkhead,
(h) structure forming a heavy liquid outlet flow path leading from the bottom of said second zone,
(i) structure forming a light liquid outlet flow path leading from an upper portion of said second zone, and
(j) structure forming a gas-liquid inlet flow channel leading to the first of said zones on the side of said bulkhead opposite said eliminator.

14. The combination set forth in claim 13 in which preferentially wet membranes in said second zone are interposed in the flow path leading to said light liquid outlet flow path.

15. The combination set forth in claim 13 in which said coalescer units extend horizontally in a predetermined array from said bulkhead and lie within the first of said chambers.

References Cited by the Examiner
UNITED STATES PATENTS

| | | | |
|---|---|---|---|
| 2,685,938 | 8/1954 | Walker et al. | 55—174 X |
| 2,710,071 | 6/1955 | Kinser et al. | 55—174 X |
| 2,771,153 | 11/1956 | Hennig | 55—484 X |
| 2,812,034 | 11/1957 | McKelvey | 55—186 |
| 2,868,312 | 1/1959 | Erwin | 55—17 |
| 2,980,204 | 4/1961 | Jordan | 55—487 |
| 3,085,381 | 4/1963 | Sobeck | 55—487 X |
| 3,108,065 | 10/1963 | McMichael | 210—460 X |

REUBEN FRIEDMAN, *Primary Examiner.*

HARRY B. THORNTON, *Examiner.*